United States Patent [19]

Kirker

[11] Patent Number: 4,543,784
[45] Date of Patent: Oct. 1, 1985

[54] EXHAUST FLOW MIXERS AND NOZZLES

[75] Inventor: Timothy J. Kirker, Alvaston, England

[73] Assignee: Rolls-Royce Limited, London, England

[21] Appl. No.: 646,048

[22] Filed: Aug. 31, 1984

Related U.S. Application Data

[63] Continuation of Ser. No. 548,016, Nov. 1, 1983, abandoned, which is a continuation of Ser. No. 288,370, Jul. 30, 1981, abandoned.

[30] Foreign Application Priority Data

Aug. 15, 1980 [GB] United Kingdom ............... 8026686

[51] Int. Cl.⁴ ............................................. F02K 3/02
[52] U.S. Cl. .................................... 60/262; 181/213; 181/220; 239/265.17; 239/265.19; 60/264
[58] Field of Search ...................... 181/213, 219, 220; 60/262, 264, 271; 239/127.3, 265.17, 265.19, 406, DIG. 7

[56] References Cited

U.S. PATENT DOCUMENTS

| | | |
|---|---|---|
| 3,153,319 | 10/1964 | Young et al. .................. 239/265.13 |
| 3,664,455 | 5/1972 | Duvvuri . |
| 4,117,671 | 10/1978 | Neal et al. . |
| 4,175,640 | 11/1979 | Birch et al. .......................... 181/213 |
| 4,217,756 | 8/1980 | Laskody ............................... 60/262 |
| 4,227,370 | 10/1980 | Kirker . |
| 4,487,017 | 12/1984 | Rodgers ............................... 60/262 |

FOREIGN PATENT DOCUMENTS

| | | |
|---|---|---|
| 895922 | 5/1958 | United Kingdom . |
| 849448 | 9/1960 | United Kingdom . |
| 881974 | 11/1961 | United Kingdom . |
| 882792 | 11/1961 | United Kingdom . |
| 895872 | 5/1962 | United Kingdom . |
| 918018 | 2/1963 | United Kingdom . |
| 1535598 | 12/1978 | United Kingdom . |
| 1540355 | 2/1979 | United Kingdom . |
| 2007303 | 5/1979 | United Kingdom . |
| 2015086 | 9/1979 | United Kingdom . |

Primary Examiner—Louis J. Casaregola
Assistant Examiner—Timothy S. Thorpe
Attorney, Agent, or Firm—Cushman, Darby & Cushman

[57] ABSTRACT

An exhaust mixer of the multi-lobed type for a mixed stream turbofan. In order to promote cortical mixing between the turbine exhaust stream and the fan air stream, the flow surfaces defining the lobes—and the troughs between the lobes—are twisted between their upstream and downstream ends so that opposing sides of each lobe and each trough comprise flow surfaces twisted in opposing senses. Noise suppressing jet propulsion nozzles can be produced with a similar construction.

10 Claims, 5 Drawing Figures

EXHAUST FLOW MIXERS AND NOZZLES

This is a continuation of application Ser. No. 548,016, filed Nov. 1, 1983, now abandoned, which in turn was a continuation of application Ser. No. 288,370, filed July 30, 1981, now abandoned.

The present invention relates to exhaust flow mixers of the type which are fitted to by-pass gas turbine aeroengines (i.e. turbo-fans) in order to assist mixing of the turbine exhaust gases with by-pass air. The invention also relates to noise suppressing jet propulsion nozzles for use with gas turbine engines.

In the past, mixing of by-pass and core exhaust flows within by-pass gas turbine aeroengines has been accomplished using the well-known multi-lobed and multi-chuted types of exhaust mixers. Such mixers are used in order to produce a more uniform velocity and temperature across the diameter of the combined jet efflux. Efficient mixing of the by-pass and core flows can lead to an increase in thrust and hence a decrease in the specific fuel consumption of the engine. It is also desirable for aerodynamic and acoustic reasons. Clearly, it is desirable to obtain as high a degree of mixing efficiency as possible.

It is known to produce a multi-lobed type of exhaust mixer for a turbo-fan from a plurality of more or less discrete flow members, each of which has a flow surface intended to contact the turbine exhaust stream and a flow surface intended to contact the fan air stream; the upstream ends of the flow members extend peripherally of the turbine exhaust stream, being attached to the rear of the turbine exhaust duct within the turbo-fan (e.g. U.S. Pat. No. 4,227,370).

A more generally known type of multi-lobed exhaust mixer exhibits a continuous corrugated profile in end-elevation; portions of the turbine exhaust stream pass through the lobes for mixing with the fan air which passes over and between the lobes; each lobe can be described as having opposed sides which extend longitudinally of the turbine exhaust stream and contact it. The corrugations in the end profile thus present the appearance of lobes defined by flow surfaces which contact the turbine exhaust stream, and troughs (between the lobes) defined by flow surfaces which contact the fan air stream. The lobes tend to direct portions of the turbine exhaust stream in an outward direction and the troughs tend to direct portions of the fan air stream in an inward direction (e.g. U.S. Pat. No. 4,177,671).

Lobed and chuted configurations have also been used for noise suppressing propulsion nozzles, noise suppression of the propulsive jet being achieved because such nozzles stimulate rapid mixing between the propulsive jet, which is equivalent to the turbine exhaust stream mentioned for the exhaust mixers above, and ambient (slipstream) air, which is equivalent to the fan air mentioned above.

Clearly, any means of increasing the efficiency of the mixing process is desirable for exhaust flow mixers and noise suppressing propulsion nozzles.

Accordingly, an exhaust mixer for a turbo-fan aeroengine has flow members with a predetermined degree of twist between their upstream and downstream ends, a first set of flow members being twisted in the clockwise sense and a second set of flow members being twisted in the anti-clockwise sense, flow members of the first set alternating in peripheral sequence with flow members of the second set whereby flow members of opposite twist are peripherally adjacent to each other so that their flow surfaces define a first set of flow directing channels for directing portions of the turbine exhaust stream outwardly and a second set of flow directing channels for directing portions of the fan air stream inwardly, the twist in the flow members serving to promote vortical mixing between the turbine exhaust stream and the fan air stream. Such vortical mixing, combined with the mixing induced by directing portions of the flow inwards and outwards across each other's flow paths, increases the efficiency of the mixing process.

Thus, by the invention, one of the turbine exhaust stream contacting sides of each lobe of a multi-lobed exhaust mixer comprises a flow surface twisted in a clockwise sense, and the other such side of each lobe comprises a flow surface twisted in an anti-clockwise sense. Stated in a different way, the turbine exhaust stream contacting flow surfaces and the fan air stream contacting flow surfaces of a multi-lobed exhaust mixer are twisted between their upstream and downstream ends such that opposing sides of each lobe and each trough comprise flow surfaces twisted in opposing senses.

The invention also provides noise suppressing jet propulsion nozzles of similar constuction to the above exhaust mixers, references to exhaust mixers, the turbine exhaust stream and the fan air being replaced by references to noise suppressing jet propulsion nozzles, the propulsive jet and slipstream air respectively.

For both propulsion nozzles and exhaust mixers, the flow surfaces are preferably peripherally contiguous over at least their upstream portions. Advantageously, the flow surfaces may be inclined generally inwardly towards the interior of the turbine exhaust stream or propulsive jet.

Preferably, the flow surfaces are twisted through an angle of not more than about 90°. The twist can be essentially uniformly helical in character, but non-uniform twisting may also be envisaged.

Embodiments of the invention will now be described, by way of example only, with reference to the accompanying drawings, in which.

The drawings are not to scale.

Figure 1:
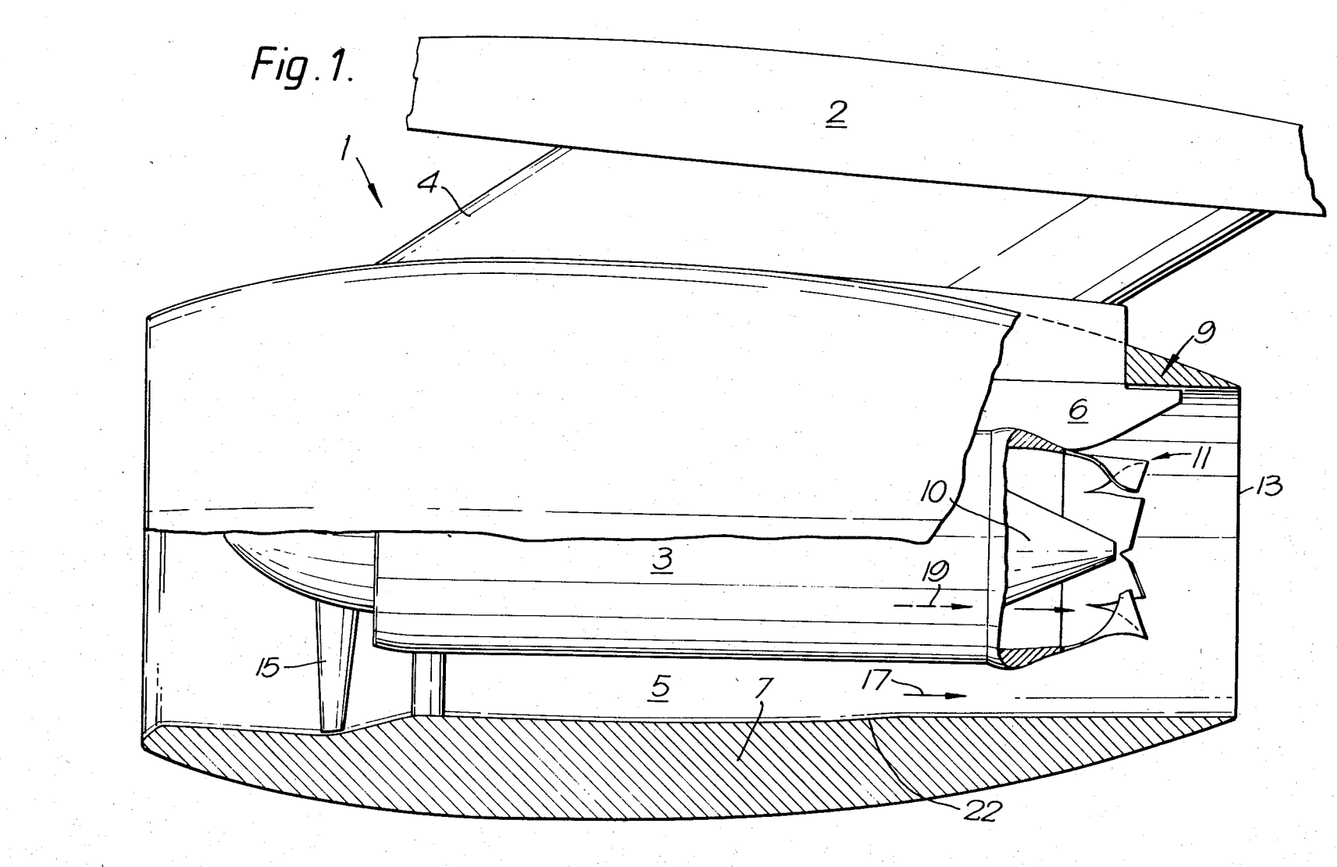
FIG. 1 is a diagrammatic part-sectional side elevation of a high by-pass ratio gas turbine aeroengine with the outer casing cut-away to reveal the location of an exhaust mixer in accordance with the present invention.

Referring first to FIG. 1, a gas turbine aeroengine 1 is of the type having a core engine 3, a by-pass duct 5 defined by by-pass duct casing and nacelle 7 surrounding the core engine 3, and an exhaust system 9 including an exhaust bullet 10, an exhaust mixer 11, and a final exhaust (propulsion) nozzle 13. The by-pass duct is supplied with by-pass air (i.e. fan air) from front fan 15, which also supplies core engine 3, the fan 15 being driven from a turbine (not shown) in core engine 3. By-pass exhaust stream 17 and core engine (i.e. turbine) exhaust stream 19 are mixed in the exhaust system 9 to produce a combined efflux, which passes to atmosphere through propulsion nozzle 13.

Engine 1 is supported from the underside of the wing 2 of an aircraft (not shown) by means of a pylon 4 which extends through the top of the nacelle and the by-pass duct casing and across the top sector of the by-pass duct 5, being attached to the core engine 3. That portion 6 of the pylon which extends across the by-pass duct 5 is shown more clearly in FIG. 2.

In the engine 1, the by-pass stream 17 is a low temperature, low velocity flow, whilst the core engine exhaust stream 19 is a high temperature, high velocity flow. Were these two streams to be allowed to issue from propulsion nozzle 13 without first being forcibly mixed internally of the engine, mixing would proceed naturally for a considerable number of nozzle diameters downstream of the engine, the velocity and temperature disparity between the core engine exhaust stream 19 and the surrounding by-pass stream 17 causing a significant amount of "jet noise" throughout the mixing zone. Inclusion of the exhaust mixer 11 within the engine 1 ensures that by the time the combined efflux exits from propulsion nozzle 13, the noisiest part of the mixing process has been accomplished and the efflux has greater homogeneity. Note that use of an internal mixer 11 allows absorption of mixing noise as it arises by means of sound absorbing linings (not shown) on the by-pass duct wall 22.

Another significant benefit is realised in terms of an increase in thrust at the propulsion nozzle relative to an unmixed jet. It can be thermodynamically proved that the sum of the thrusts available from a hot high velocity core engine exhaust stream surrounded by a cool low velocity by-pass stream is less than the thrust available from a homogeneous jet resulting from thorough mixng of core engine exhaust and by-pass streams before exit from the propulsion nozzle. Since greater thrust is being produced per unit weight of fuel burnt, efficient mixing of the core engine exhaust and by-pass streams in this way increases the fuel economy of the engine.

Figure 2:
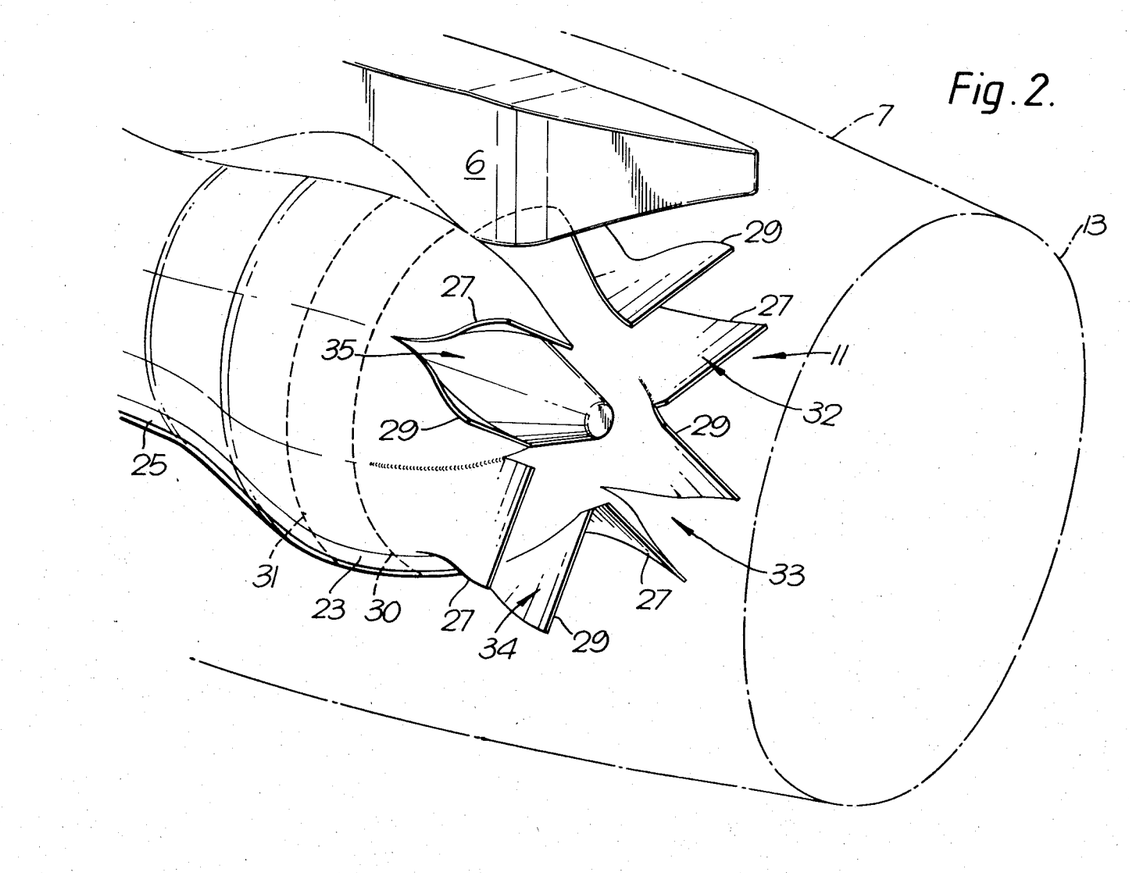
FIG. 2 is a more detailed perspective view of the exhaust mixer.
Figure 3:
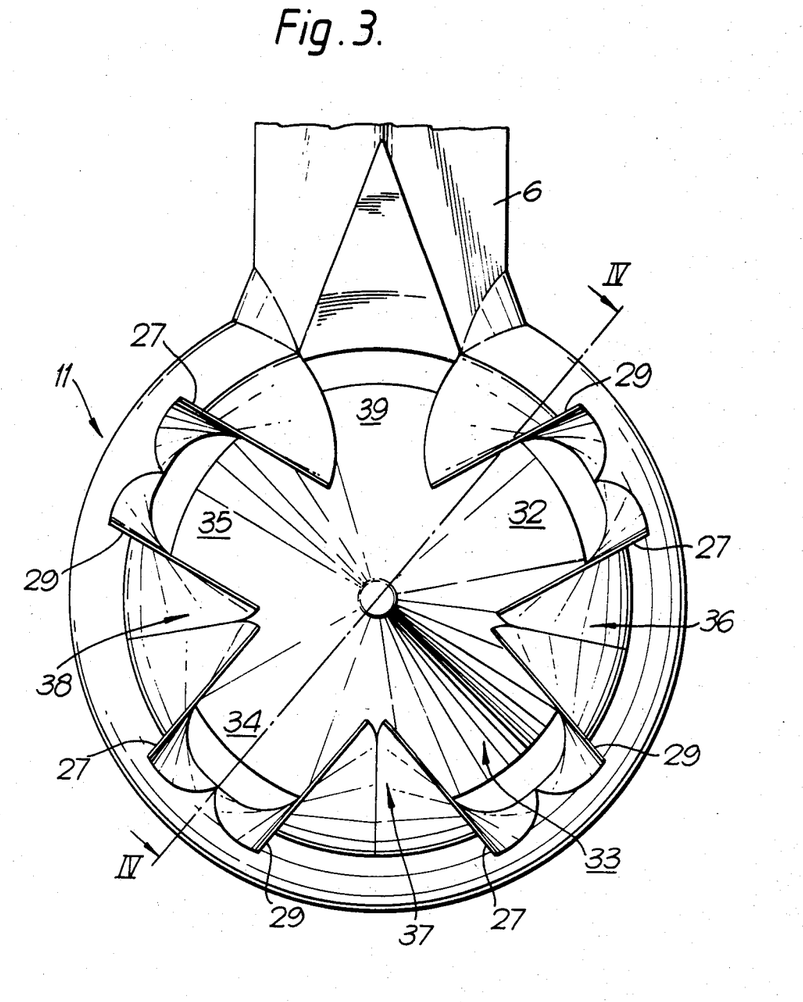
FIG. 3 is a rear elevation of the exhaust mixer.
Figure 4:
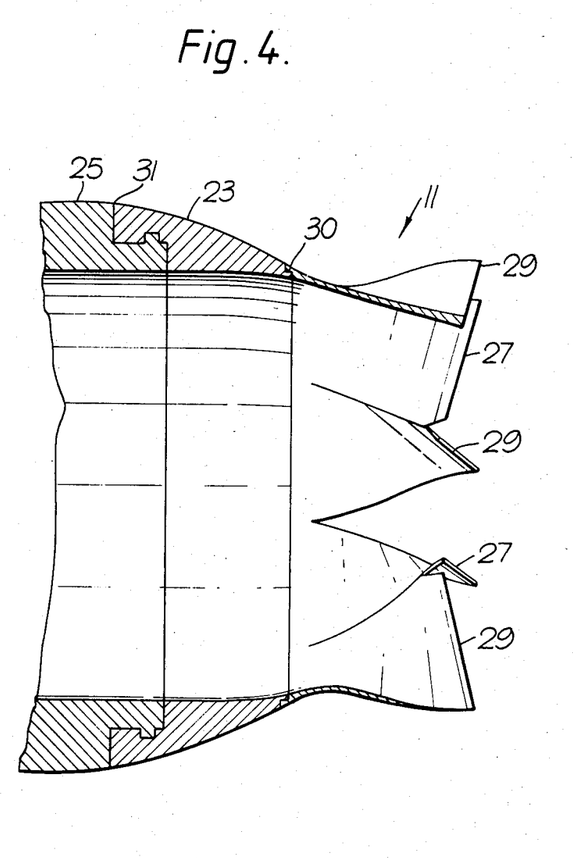
FIG. 4 is a cross-section of the exhaust mixer taken on line IV—V in FIG. 3.

Referring now to FIGS. 2, 3 and 4, FIG. 2 shows the exhaust mixer 11 and part of the support pylon 6 situated within nacelle 7, which is indicated only by dashed lines. FIG. 3 shows the mixer 11 and pylon 6 in isolation from other structure, the contours of the mixer flow surfaces being indicated by means of shading. FIG. 4 shows only the mixer 11 and its connection to the core engine.

The exhaust flow mixer 11 is of a novel type, comprising an annular array of first and second sets of twisted elongate vanes 27,29 respectively, which are flow members having a specified degree of twist between their upstream and downstream ends. In this embodiment the vanes are of constant width between their upstream and downstream ends, but this is not essential. The first set of vanes 27 are twisted clockwise and the second set of vanes 29 are twisted anticlockwise. Their upstream ends extend peripherally of the stream of turbine gases and are joined at 30 to a flanged ring 23, which in turn is joined to the downstream extremity of the core engine casing 25. The vanes project from the ring 23, and hence from the aft end of core engine casing 25, in a generally downstream direction, but the vanes' 27,29 twist causes their downstream ends to extend transversely of the by-pass and core engine exhaust streams 17 and 19.

As will be seen from the drawings, the vanes of the first set 27 alternate with the vanes of the second set in peripheral sequence such that vanes of opposite twist are peripherally adjacent to each other. The shape of adjacent vanes is therefore complementary so that they cooperate to define a first set of flow channels or lobes 32-35 (FIG. 3), which direct portions of the turbine exhaust stream 19 outwardly and a second set of flow channels or troughs 36 to 38 which direct portions of the by-pass stream inwardly, thus causing the two streams to interpenetrate each other and mix.

As seen in FIG. 3, the mixer has a shape comprising four lobes 32-35 radiating from a common central area, with troughs 36-38 between the lobes. The number of lobes to be incorporated is at the discretion of the designer. To allow for the presence of support pylon 6, the topmost pair of vanes 27 and 29 are peripherally spaced apart from each other, leaving a gap 39 instead of a trough the fan air being encouraged to flow under the lee of the pylon by the complementary twist of the top-most vane pair. The pylon is aerodynamically shaped to encourage minimum disturbance of the fan air flow therepast.

As also shown best in FIG. 3, the vanes 27,29 do not extend directly aft of the core engine, but are inclined slightly inwardly, towards the centre of the mixer i.e. the longitudinal centre-lines of the vane flow surfaces do not extend exactly parallel to the centre-line of the engine/mixer combination, but if produced would intersect the centre-line downstream of the mixer. This ensures that the troughs or inwardly directed flow channels 36-38 cause the fan air to penetrate a long way into the interior of the turbine gas stream for more rapid and efficient mixing. In combination with the fact that in the troughs 36-38 the edges of the vanes are twisted towards each other by equal amounts, the inward inclination of the vanes also ensures that in the troughs the peripherally adjacent edges of the vanes are very largely contiguous with each other. Note however that the vane edges in the lobes 32-35 do not abut each other, since they are twisted away from each other.

Mixing is much facilitated by the vortical component induced in the interpenetrating flows by the twist of the vanes, and especially this is so because vortices of opposite hand are produced adjacent to each other in each flow channel, this tending both to entrain further by-pass air into flow channels 36-38 and entrain further turbine gases into flow channels 32-35. Further, the efficiency with which gas flows can be mixed depends upon the effectiveness of the shearing action and the amount of turbulence at the interface between the gas flows, and vortical flow increases this shearing action and the amount of turbulence.

The effectiveness of the vanes 27 and 29 in deflecting the gases which contact their flow surfaces, thereby promoting rapid mixing of the by-pass and core engine exhaust streams to produce a combined jet efflux, is due to the Coanda Effect. Using the Coanda Effect, fluid streams can be caused to change their direction of flow by locating suitably shaped flow surfaces in their flow paths, the fluid tending to "adhere" to the surfaces as it flows over them. This adherence is due to the existence of a relatively stagnant boundary layer of fluid close to the surfaces; but the further away from a flow surface a portion of fluid is, the less influence the Coanda Effect has on its direction of motion. In the case of the present mixer 11, little or none of the by-pass or core engine exhaust streams pass through the mixer without being substantially deflected, since not only are they subjected to the influence of the Coanda Effect in the flow over the vanes, but they are also affected by the resulting vortical processes.

Figure 5:
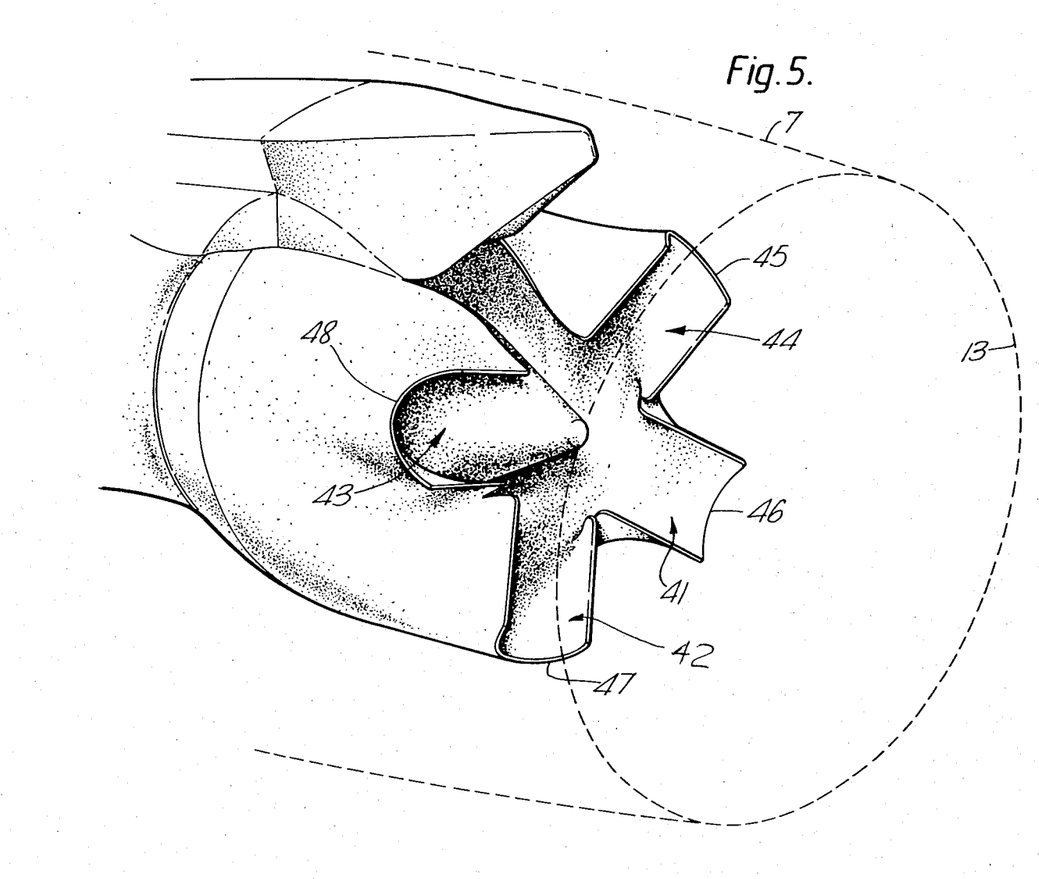
FIG. 5 is a perspective view similar to FIG. 2 but showing another embodiment of the invention.

Moving on to FIG. 5, there is seen a modified version of mixer 11, in which in order to encourage better streamlining of the fan air flow over the exterior flow surfaces of the mixer, the flow surfaces are made contiguous with each other in the region of the lobes 41-44, i.e. in comparison with FIGS. 2 and 3, the gaps between the adjacent vanes 27,29 in the radially outer portions of the lobes 32-35 have been "faired in" by bridging portions 45-48, which thus join the edge of one helically twisted region of flow surface to the adjacent edge of another region of flow surface helically twisted in the opposite sense. This means that the lobes 41-44 are fully defined and bounded by the flow surfaces. Nevertheless, the essential characteristic of the mixer, namely the opposing twists of the vanes or flow surfaces comprising it, is still present.

In the two embodiments of the invention described above, the vanes or flow surfaces are twisted through a helix angle of roughly 70° between their upstream and downstream ends. However, this angle may be varied according to the characteristics desired in the mixer, such as the degree of vorticity to be imparted to the flow and the cross-sectional shape of the flow channels (lobes or troughs) at their exits. For instance, in the above two embodiments (as seen from a position downstream of the mixer, such as in FIG. 3), the lobes have a rectangular section and the troughs a triangular section at their exits; but if the angle of twist were to be increased to 110°, the lobes would have triangular exits and the troughs would have rectangular exits. Clearly, at some angle of twist, substantially less than 180°, a configuration would be reached in which at the exit plane of the mixer the lobe areas would no longer be connected to the central area of the mixer, since the radially inner downstream edge portions of the vanes in each pair would be in contact. Generally, however, an angle of twist of 90° or less is to be preferred in order to prevent breakways of the air or turbine gas flows from the flow surfaces.

Although in the two embodiments of the invention already discussed, the angle of twist of each flow surface increases uniformly between its upstream and downstream ends, non-uniformly twisted flow surfaces could be used instead.

The exhaust mixers discussed above are configured to allow for the presence of a pylon in the by-pass duct of the engine, but in some by-pass engines such a pylon is not present. In the absence of a pylon in the by-pass duct, the mixer can be designed without a peripherally extending gap between two of the twisted flow surfaces, i.e. it is designed for a peripherally continuous flow of by-pass air.

Although the invention has been described in terms of a hot turbine exhaust stream and a cooler by-pass stream, it should be realised that the invention is also applicable to cases where fuel is burnt in the by-pass air within the by-pass duct in order to produce extra thrust, the by-pass stream thus also being hot and having increased velocity as it flows over the mixer.

The embodiments of the invention already discussed concern exhaust mixers, but twisted flow surfaces could also be used to produce noise suppressing jet propulsion nozzles of similar form to the exhaust flow mixers, the air stream surrounding the nozzle being the slipstream due to the forward flight rather than by-pass air.

I claim:

1. A turbofan aeroengine comprising:
   a core engine;
   a bypass duct surrounding said core engine and having a single propulsion nozzle, a turbine exhaust stream and a bypass fan air stream being mixed internally of said aeroengine to produce a combined exhaust stream for passage through said propulsion nozzle;
   said core engine having an exhaust mixing nozzle of the multi-lobed type having a shape in end elevation comprising lobes radiating from a common central area with troughs between said lobes;
   said lobes and troughs comprising, respectively, outwardly directed flow channels for said turbine exhaust stream and inwardly directed flow channels for said bypass fan air stream to mix a substantial portion of said turbine exhaust stream and said bypass air stream; and
   means including said exhaust mixing nozzle for providing a Coanda Effect to those portions of said turbine exhaust stream and said bypass air stream flowing past said exhaust mixing nozzle, for generating multiple vortices of a mixed turbine exhaust stream and bypass fan air stream downstream of said exhaust mixing nozzle, and for mixing a substantial portion of said turbine exhaust stream and said bypass fan air stream to produce a combined mixed exhaust stream for passage through said propulsion nozzle, said means including;
   said exhaust mixing nozzle being formed of a plurality of twisted flow surfaces, said twisted flow surfaces having upstream and downstream ends and having a predetermined and progressive degree of twist between said upstream and said downstream ends,
   peripherally adjacent ones of said twisted flow surfaces being of mutually complementary and opposite twists to define said outwardly and inwardly directed flow channels of said lobes and said troughs,
   said peripherally adjacent twisted lobe surfaces being peripherally adjoining at least at their upstream ends and over at least a major portion of said inwardly directed flow channels;
   said twisted flow surfaces providing a Coanda Effect to those portions of said turbine exhaust stream and said bypass fan air stream flowing over said flow surfaces to deflect said stream portions without said stream portions breaking away from said flow surfaces and generating multiple vortices of a mixed turbine exhaust stream and bypass fan air stream downstream of said downstream end of each of said flow surfaces, adjacent circumferential ones of said vortices being counter-rotating to promote further mixing, said exhaust mixing nozzle thereby producing a mixing action substantially thoughout said combined exhaust stream before passage of said combined exhaust stream through said propulsion nozzle.

2. An exhaust mixer as claimed in claim 1 in which said flow surfaces have an angle of twist between their upstream and downstream ends of not more than about 90°.

3. An exhaust mixer as claimed in claim 1 in which said flow surfaces are inclined generally inwardly towards the interior of the turbine exhaust stream.

4. An exhaust mixer as claimed in claim 1 in which said flow surfaces have a substantially helical twist.

5. A turbofan aeroengine comprising:
   a core engine:

a bypass duct surrounding said core engine and having a single propulsion nozzle, a turbine exhaust stream and a bypass fan air stream being mixed internally of said aeroengine to produce a combined exhaust stream for passage through said propulsion nozzle;

said core engine having an exhaust mixing nozzle of the multi-lobed type having a shape in end elevation comprising lobes radiating from a common central area with troughs between said lobes;

said lobes and troughs comprising, respectively, outwardly directed flow channels for said turbine exhaust stream and inwardly directed flow channels for said bypass fan air stream to mix a substantial portion of said turbine exhaust stream and said bypass fan air stream; and means including said exhaust mixing nozzle for providing a Coanda Effect to those portions of said turbine exhaust stream and said bypass air stream flowing past said exhaust mixing nozzle, for mixing a substantial portion of said turbine exhaust stream and said bypass fan air stream and for generating a vortex of a mixed turbine exhaust stream and bypass fan air stream downstream of said exhaust mixing nozzle, said means including:

said exhaust mixing nozzle being formed of a plurality of twisted flow surfaces, said twisted flow surfaces having upstream and downstream ends and having a predetermined and progressive degree of twist between said upstream and said downstream ends, peripherally adjacent ones of said twisted flow surfaces being of mutually complementary and opposite twists to define said outwardly and inwardly directed flow channels of said lobes and said troughs, said peripherally adjacent twisted lobe surfaces being peripherally contiguous at least at their upstream ends and over at least a major portion of said inwardly directed flow channels;

said twisted flow surfaces providing a Coanda Effect to those portions of said turbine exhaust stream and said bypass fan air stream flowing over said flow surfaces to deflect said stream portions without said stream portions breaking away from said flow surfaces and generating a vortex of a mixed turbine exhaust stream and bypass fan air stream downstream of said downstream end of each of said flow surfaces, adjacent circumferential ones of said vortices being counter-rotating to promote further mixing, said exhaust mixing nozzle thereby producing a mixing action substantially thoughout said combined exhaust stream before passage of said combined exhaust stream through said propulsion nozzle.

6. An exhaust mixer as claimed in claim 5 in which said flow surfaces have an angle of twist between their upstream and downstream ends of not more than about 90°.

7. An exhaust mixer as claimed in claim 5 in which said flow surfaces are inclined generally inwardly towards the interior of the turbine exhaust stream.

8. An exhaust mixer as claimed in claim 5 in which said flow surfaces have a substantially helical twist.

9. In a turbonfan aeroengine of the type having a core engine surrounded by a bypass duct and having a single proplusion nozzle, a turbine exhaust stream and a bypass fan air stream being mixed together internally of said aeroengine to produce a combined exhaust stream for passage through said single proplusion nozzle, said core engine having an exhaust mixing nozzle of the multilobed type having a shape in end elevation including lobes radiating from a common central area with troughs between said lobes, said lobes and said troughs comprising, respectively, outwardly directed flow channels for said turbine exhaust stream and inwardly directed flow channels for said bypass fan air stream, the improvement comprising:

means including said exhaust mixing nozzle for producing a Coanda Effect to those portions of said turbine exhaust stream and said bypass air stream flowing past said exhaust mixing nozzle and for substantially mixing and generating a vortex of said turbine exhaust stream and bypass fan air stream downstream of said exhaust mixing nozzle;

said exhaust mixing nozzle having a plurality of twisted flow surfaces, said twisted flow surfaces having upstream and downstream ends and having a predetermined and progressive degree of twist between said upstream ends and said downstream ends;

peripherally adjacent ones of said twisted flow surfaces being of mutually complementary and opposite twists to thereby define said outwardly and inwardly directed flow channels of said lobes and said troughs;

said peripherally adjacent twisted flow surfaces being peripherally contiguous at least at their upstream ends and over at least a major portion of said inwardly directed flow channels;

said twisted flow surfaces providing a Coanda Effect to those portions of said turbine exhaust stream and said fan air stream flowing over said flow surfaces to thereby deflect said stream portions without said stream portions breaking away from said flow surfaces, said Coanda Effect flow generating a vortex of the mixed turbine exhaust stream and fan air stream downstream of said downstream end of each of said flow surfaces, adjacent circumferential ones of said vortices being counter-rotating and promoting further mixing to thereby produce said substantial mixing of said combined exhaust stream before passage thereof through said propulsion nozzle.

10. A turbofan aeroengine comprising:

a core engine;

a bypass duct surrounding said core engine and having a single propulsion nozzle, a turbine exhaust stream and a bypass fan air stream being mixed internally of said aeroengine to produce a combined exhaust stream for passage through said propulsion nozzle;

said core engine having an exhaust mixing nozzle of the multi-lobed type having a shape in end elevation comprising lobes radiating from a common central area with troughs between said lobes;

said lobes and troughs comprising, respectively, outwardly directed flow channels for said turbine exhaust stream and inwardly directed flow channels for said bypass fan air stream to mix said turbine exhaust stream and said bypass air stream; and means including said exhaust nozzle for generating multiple vortices of a mixed turbine exhaust stream and bypass fan air stream downstream of said exhaust mixing nozzle to product a combined mixed exhaust stream for passage through said propulsion nozzle, said means including said exhaust mixing nozzle being formed of a plurality of twisted flow surfaces, said twisted flow surfaces having upstream and downstream ends and having a predetermined and progressive degree of twist between said upstream and said downstream ends, peripherally adjacent ones of said twisted flow surfaces being of mutually complementary and opposite twists to define said outwardly and inwardly directed flow channels of said lobes and said troughs, said peripherally adjacent twisted lobe surfaces being peripherally adjoining at least at their upstream ends and over at least a major portion of said inwardly directed flow channels;

said twisted flow surfaces generating multiple vortices of a mixed turbine exhaust stream and bypass fan air stream downstream of said downstream end of each of said flow surfaces, adjacent circumferential ones of said vortices being counter-rotating to promote further mixing, said exhaust mixing nozzle thereby producing a mixing action substantially thoughout said combined exhaust stream before passage of said combined exhaust stream through said propulsion nozzle.

* * * * *